Feb. 25, 1947.　　　E. LABIN ET AL　　　2,416,330
MULTI-CHANNEL RECEIVING SYSTEM
Filed Aug. 7, 1944　　　3 Sheets-Sheet 3

INVENTORS
EMILE LABIN
DONALD D. GRIEG
BY
*Percy P. Lantz*
ATTORNEY

Patented Feb. 25, 1947

2,416,330

UNITED STATES PATENT OFFICE 2,416,330

MULTICHANNEL RECEIVING SYSTEM

Emile Labin, New York, and Donald D. Grieg, Forest Hills, N. Y., assignors to Federal Telephone and Radio Corporation, New York, N. Y., a corporation of Delaware Application August 7, 1944, Serial No. 549,854

5 Claims. (Cl. 179—15)

This invention relates to multi-channel communicating systems and more particularly to a system for selectively receiving the channel pulses of a multi-channel pulse train.

In the co-pending application of E. Labin-D. D. Grieg-G. J. Lehmann for Multi-channel communicating system, Serial No. 548,368, filed Aug. 7, 1944, a multi-channel communicating system is disclosed having transmitting means at one terminal for transmitting a train of channel pulses wherein the pulses of one channel are provided with an identifying characteristic distinct from the pulses of other channels for use as synchronizing pulses. The pulses of the other channels are time modulated with respect to the pulses of the synchronizing channel according to signal intelligence of the respective channels. A receiving system is provided at a second terminal for receiving the train of channel pulses. The receiving system includes means for obtaining energy of the synchronizing pulses for use in selective segregation of the pulses of the different channels.

In the co-pending application of D. D. Grieg, Serial No. 459,959, filed September 28, 1942, a simple demodulator circuit is disclosed for use with the "push-pull" type of time modulation of pulses. The "push-pull" type of time modulation herein referred to is that form where the successive pulses are displaced toward and away from each other in accordance with the instantaneous value of the modulating signal wave. The demodulator circuit includes a tuned resonant circuit, shock excitable by the pulses received to produce an oscillatory wave which combines with the input pulse potentials in a tube of the circuit. The resonant circuit is tuned to a harmonic of the cadence frequency of the pulses so that as the pulses are displaced due to modulation, the output pulses of the demodulator circuit will vary in amplitude according to the time displacement of the signal pulses. This provides a simple circuit for translation of time modulation of pulses into pulses of amplitude modulation from which the audio component thereof can be obtained by a filtering operation.

It is an object of this invention to provide a multi-channel receiving system for selectively receiving the channels of a train of multi-channel pulses such as employed in the aforesaid application Serial No. 548,368, and demodulating the pulses of a selected channel according to the principles of demodulation set forth in the aforesaid application No. 459,959.

According to one feature of the invention the synchronizing pulses are mixed in each receiving channel with the pulses of a selected channel, the synchronizing pulses operating as bench mark pulses for the channel pulses. The time displacement of the pulses is represented by variations of the interval between each bench mark pulse and the next adjacent channel pulse forming a pulse train similar to the "push-pull" form of pulse time modulation. The stable timing of the synchronizing pulses improves the lineal translation of the time displacements of the channel pulses.

Another feature of the invention lies in the separation of the pulses of the different channels by means of a delay network in which bench mark pulses are delayed for mixing with the pulses of a selected channel. The delay network is arranged to provide different trains of differently timed pulses from the pulse energy of the synchronizing channel. Certain of these pulse trains are employed in the receiving channels to separate the pulses of a desired channel from pulses of other channels. Other of the pulse trains of desired retardation are mixed with the pulses of separated channels as bench mark pulses.

For further understanding of the objects and features of our invention reference is made to the following detailed description to be read in connection with the accompanying drawings in which.

Figure 1:
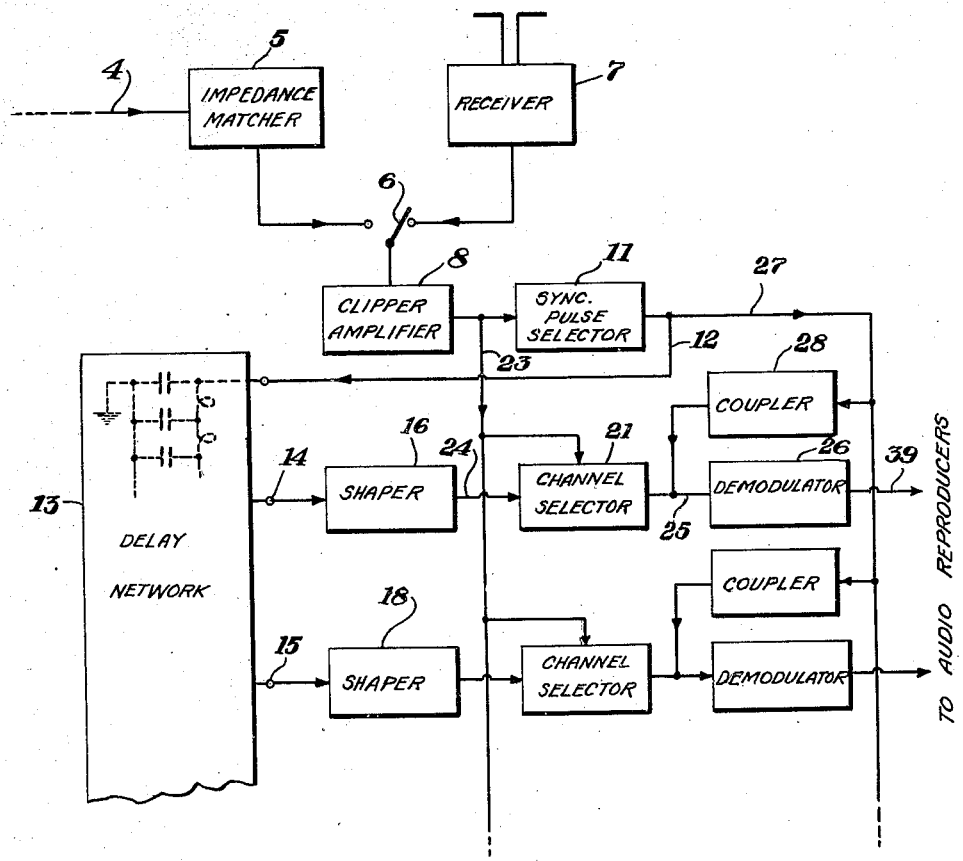
Fig. 1 is a schematic block diagram of a multi-channel receiving system according to the principles of this invention.
Figure 2:
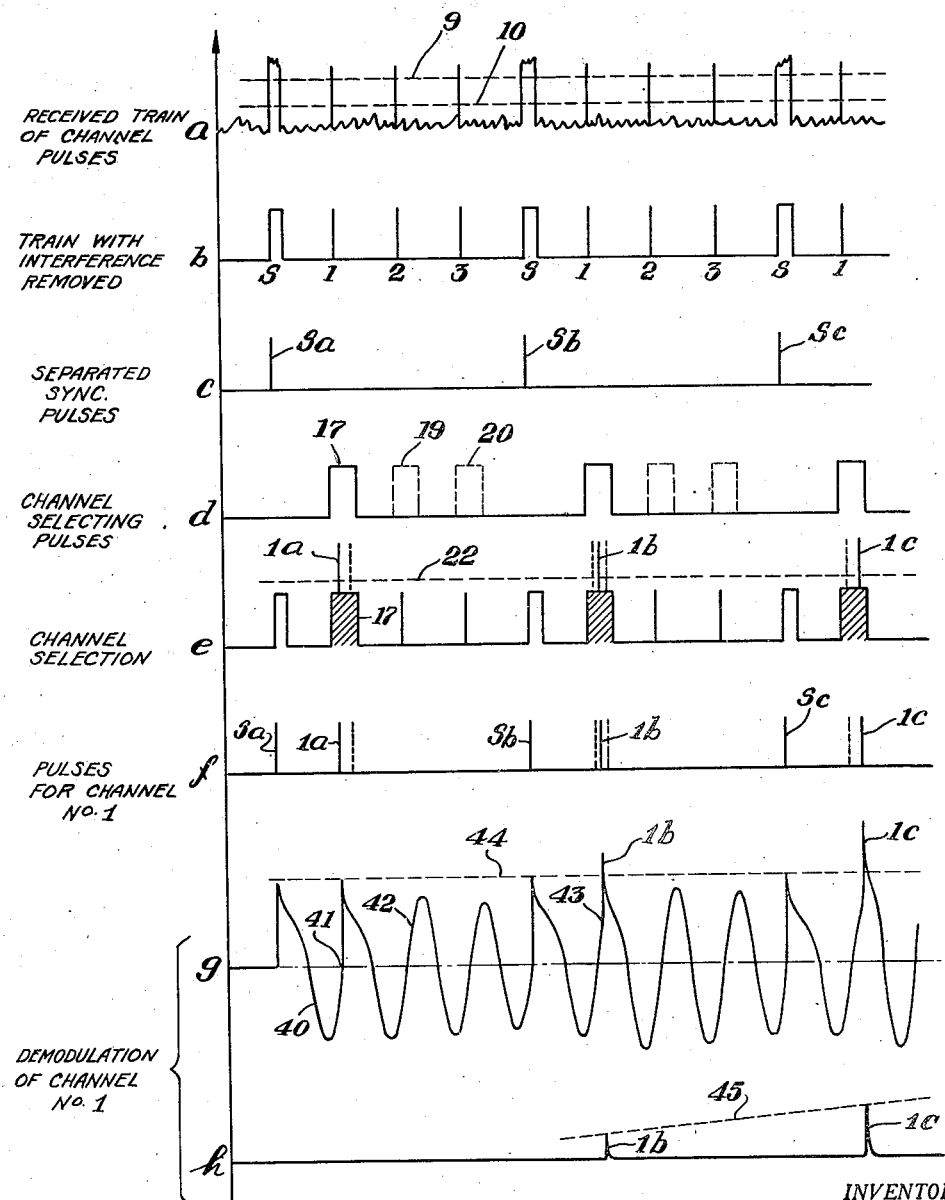
Fig. 2 is a graphical illustration used in explaining the operation of the receiving system.

Referring to Figs. 1 and 2 of the drawings the receiving system shown in Fig. 1 includes the plurality of receiving channels for selective reception of the channels of a train of multi-channel pulse such as illustrated in graph $a$ of Fig. 2. While the train of pulses is shown to include three signal channels 1, 2 and 3 besides a synchronizing channel S, it will be understood that many additional channels may be provided depending upon the length of the train cycle, the width of the channel pulses, the maximum time modulation of the pulses and the width of safety interval required between pulses of adjacent channels.

The receiving system of Fig. 1 is shown with two receiving channels, the provision for additional channels being indicated by broken line connections. The receiving system is shown for purposes of illustration as capable of receiving over either a direct line connection 4 through impedance matcher 5 or over a radio link by shifting switch 6 to the output connection of radio receiver 7. The received train of channel pulses may have the appearance shown in graph $a$ of Fig. 2 or according to graph $b$. Graph $a$ shows the train of pulses with interference fluctuations varying the amplitudes of the pulses. Where the system is subject to such interference, as in the case of a radio link, either the radio receiver 7 may be provided with clipping means or a separate clipper amplifier may be provided as indicated at 8 for clipping the pulse train between levels 9 and 10 thereby eliminating the interference occurring between pulses and during pulses. The pulse train is then applied to a synchronizing pulse selector 11 which may be of any known character capable of discriminating between the pulses of two different widths. Since the synchronizing pulses are provided with pulse width greater than the pulse width of the other channel pulses they are readily segregatable and the output, depending on the circuit or pulse shaper means that may be included in such selector circuit, may comprise narrow width pulses $Sa$, $Sb$, $Sc$, etc., by graph $c$. The synchronizing pulses thus separated from the other channel pulses are applied over connection 12 to a delay network 13. The network 13 is provided with output connections 14, 15 etc. to provide different amounts of retardation for the synchronizing pulse energy in accordance with the time spacing between the pulses of the successive channels. The delayed energy of output 14 is applied to a shaper 16 whereby the delayed pulse energy is shaped similarly as illustrated at 17, graph $d$. The retardation of the pulses 17 is shown to be such as to position them in coincidence with the pulses of channel 1. The pulse shaper 18 of the second receiving channel shapes the pulse energy received from output 15 into pulses of the shape indicated at 19. The next succeeding receiving channel is provided with retardation pulses of like shape as indicated at 20. While pulses 19 and 20 are positioned in coincidence with the pulses of channel 2 and 3 respectively, it will be readily understood that the retardation of pulses such as 17 may be selected by changing the input to shaper 16 from output 14 to some other output of the delay network 13.

For separation of the pulses of a given channel from the train of multi-channel pulses, each receiving channel is provided with a channel selector as indicated at 21. The channel selector comprises a known form of mixer having a threshold clipping level as indicated at 22 in graph $e$. The train of multi-channel pulses is applied from the clipper amplifier 8 over connection 23 to the channel selector while selector pulses 17 are applied thereto over connection 24. These two trains of pulses provide a combined potential for the mixer similarly as illustrated in graph $e$, whereby the channel pulses $1a$, $1b$ and $1c$ of channel 1 are superimposed upon the pulse potentials 17 thereby causing the mixer to pass pulse energy according to the pulses of channel 1.

The pulse output of selector 21 is applied over connection 25 to a demodulator 26 together with synchronizing pulses $Sa$, $Sb$, $Sc$ etc. from the selector 11 over connection 27 and coupler 28. The mixed pulses thus applied over connection 25 are indicated by graph $f$. The synchronizing pulses act as bench mark pulses for the pulses of channel 1. The time modulation of these pulses is varied between two limits as indicated by the associated broken lines for purposes of illustration, pulse $1a$ representing one limit of modulation, the position of pulse $1b$ representing a displacement midway between the limits of modulation and the position of pulse $1c$ representing the opposite limits of modulation.

Figure 4:
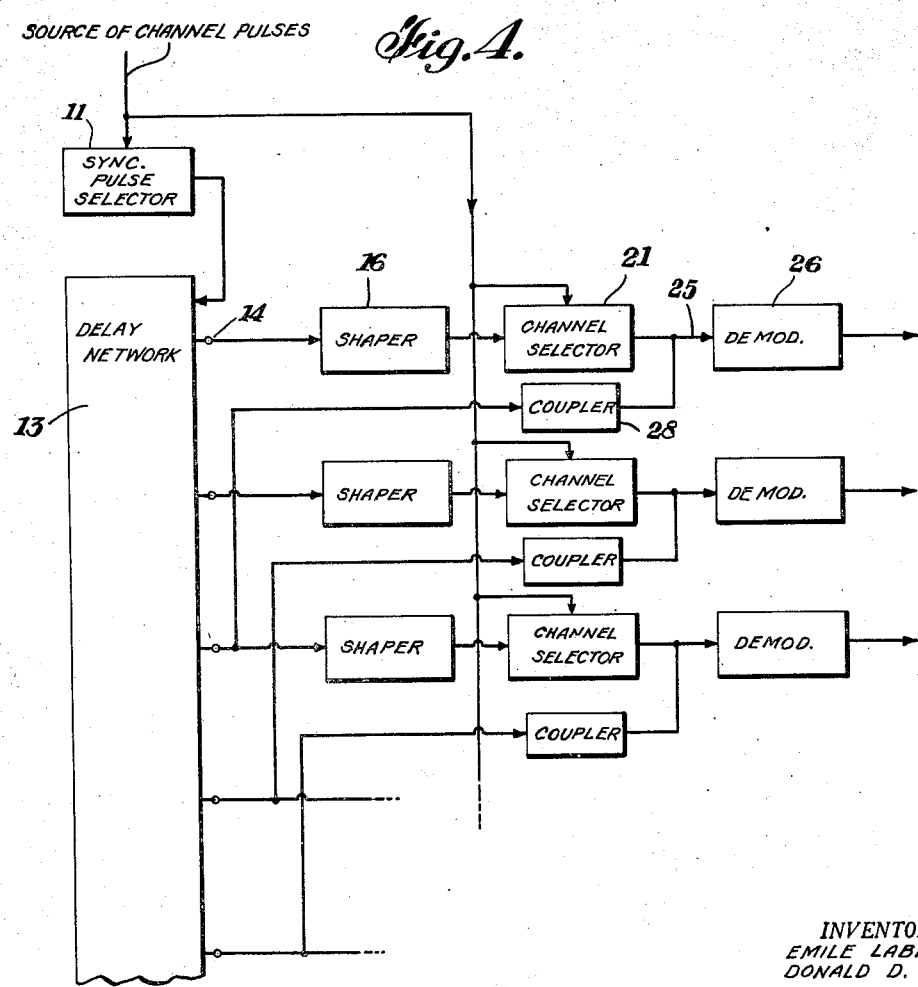
Fig. 4 is a schematic block diagram of a modification of the receiving system in Fig. 1.

It will be noted that the bench mark pulses $Sa$, $Sb$ and $Sc$ pair off with the pulses of the channel thereby providing uneven spacing between adjacent pulses. The amount of this uneven spacing depends on the relative timing of the synchronizing pulses and as illustrated in connection with Fig. 4 the synchronizing pulses used as bench mark pulses may be retarded to provide the desired spacing between the pulses applied to the demodulator. As will be made clear hereafter, the demodulator may be tuned to demodulate the pulse pairs even where the pulses are unevenly spaced as much or more than that indicated in graph $f$.

Figure 3:
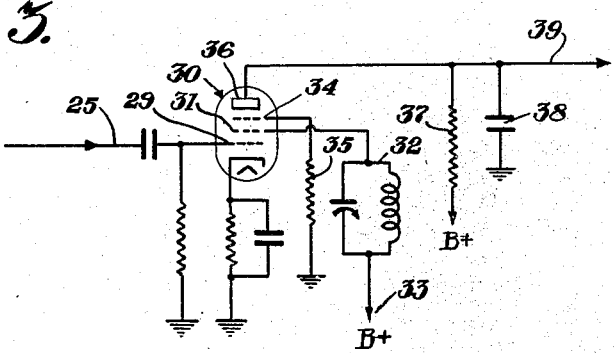
Fig. 3 is a schematic circuit diagram of a demodulator employed in the system of Fig. 1.

The demodulator 26 as hereinbefore stated is of the character disclosed in the aforementioned application of D. D. Grieg, Serial No. 459,959, a schematic diagram of which is shown in Fig. 3. The input pulses over connection 25 are applied to the main grid 29 of vacuum tube 30. Connected to the screen grid 31 is a shock excitable resonant circuit 32 having a variable condenser and inductance to which is applied a source of positive potential at 33. The suppressor grid 34 of the tube is connected through a resistor 35 of high value to ground. The plate 36 is connected to load resistor 37 which is shunted by a condenser 38 to output 39 to which may be connected any suitable reproducer or utilization circuit such as a filter and ear phones where audio signals are desired.

In operation of the demodulator circuit of Fig. 3, the resonant circuit 32 is tuned to a frequency, the period of which is preferably a harmonic of the cadence frequency of the pulses applied to the demodulator over input connection 25 although it may be tuned to the same frequency as that of the pulse cadence. When a pulse is applied to the grid 29 the amplitude thereof is such as to effect a passage of energy to the screen grid 31 thereby establishing an oscillatory wave 40 such as indicated in graph $g$. The voltage of this oscillatory wave is applied to the tube at the screen grid 31. It will be understood that this wave is of damped characteristics, the damping thereof depending largely upon the Q of the circuit 32. Circuit 32 is so tuned as to provide a wave which normally passes through the pulse position points of graph $f$ when the pulses are in the position normally assumed in the absence of modulation. Where the pulses are grouped in pairs with relatively close spacing between the pairs, the wave 40 may pass through but one cycle between the pulses of a pair although this depends upon the tuning of circuit 32. By tuning circuit 32 the wave may be caused to pass through a half-cycle or several cycles between adjacent pulses.

The tuning however, must bear a relation to the pulse timing similarly as illustrated in the drawing so that the signal pulse $1a$ will occur during a lineal portion of the wave. Since the pulse $1a$ is at one limit of modulation it may be caused to occur at the point where the wave crosses the zero axis as indicated at 41, although it may be caused to occur at some other point such as below the zero axis if desired.

The pulse 1a shock excites the circuit to renew with added vigor the oscillations as indicated at 42, the bench mark pulse Sb also shock exciting the circuit 32 in like manner to 1a. Pulse 1b occurs on a lineal portion of the wave at a point 43 above the zero axis thereby causing the oscillatory swing to exceed those produced by pulses Sa, 1a, Sb. The oscillations following the pulse 1b, while of a larger swing than the wave preceding pulse 1b, nevertheless provides the desired linear increasing potential at the occurrence of pulse Sc and the oscillation following the pulse Sc produces a linear increasing portion for any position that pulse 1c may assume. It should also be noted that the stable regular occurrence of the bench mark pulses has a steadying effect on the demodulating wave which improves the lineal translation of the time displacements of the channel pulses.

The threshold clipping level of the tube 30 is so chosen as to occur at the peak of the wave potential produced by the bench mark pulses or those channel pulses in the position indicated for pulse 1a. This clipping level is indicated at 44 and produces an output of pulses as indicated by graph h, the amplitude variations of which define the envelope 45 of the original modulated signal wave In Fig. 4, the receiver system is shown with the pulse energy which mixed with the channel pulses at the input of the demodulator circuit, taken from the delay network 13. The elements shown in Fig. 4 correspond directly to the elements of Fig. 1, the difference being in the circuit connections for applying a synchronizing pulse energy to the connection 25. The coupler 28 is connected to an outlet of the device 13 having synchronizing pulse energy of the desired retardation to present bench marks at some desired point preferably near the half-way mark between the successive pulses of a selected channel. The circuit 32 of the demodulator (Fig. 3) is tuned according to the normal spacing of the pulses applied over connection 25 so that the resulting wave presents linear portions at the occurrence of the pulses.

While we have shown and described particular forms of systems by which the principles of our invention may be practiced, it is recognized that many variations may be made without departing from the invention. It is to be understood, therefore, that the forms herein shown and described are to be regarded as illustrative of the invention only and not restricting the appended claims.

We claim:

1. In a multi-channel receiving system for receiving a plurality of channels of time modulated pulses interleaved in sequence in the form of a single multi-channel train, the pulses of one of the channels being provided with an identifying characteristic distinct from the pulses of the other channels for use as synchronizing pulses; means to separate the synchronizing pulses from said single train, retardation means to retard by different amounts the pulse energy of the synchronizing pulses to provide different trains of selector pulses each such train corresponding in time to one of the channels, a plurality of receiving channels each having a channel selector means and means to apply thereto the selector pulses of a train having the proper timing for segregating a desired channel from said single train of pulses, means for mixing energy of said synchronizing pulses with the segregated pulses of said desired channel to provide a bench mark pulse for each of said segregated pulses, and means for translating into amplitude displacements the time displacements of said segregated pulses with respect to said bench mark pulses.

2. A system according to claim 1 wherein the means for mixing the energy of the synchronizing pulses with each of the segregated pulses includes retardation means to time said synchronizing pulse energy at a given time interval with respect to the positions normally assumed by said segregated pulses in the absence of modulation.

3. A system according to claim 1 wherein the means for mixing the energy of the synchronizing pulses with each of the segregated pulses includes selected portions of said retardation means to time said synchronizing pulse energy at a given time interval with respect to the positions normally assumed by said segregated pulses in the absence of modulation.

4. In a receiving system for receiving a given channel of pulses from a train of channel pulses wherein the pulses of one channel are provided as synchronizing pulses with an identifying characteristic distinct from the pulses of other channels and the pulses of said other channels are time modulated with respect to said synchronizing pulses; means to separate the synchronizing pulses from said train, retardation means to retard the energy of the synchronizing pulses to provide a train of selector pulses corresponding in time to said given channel, a channel selector means, means to apply said selector pulses to said selector means for segregating the pulses of said given channel from said train, means for mixing energy of said synchronizing pulses with the pulses of said given channel to provide a bench mark pulse for each of the pulses of said given channel, and means for translating into amplitude displacements the time displacements of the pulses of said given channel with respect to said bench mark pulses.

5. A system according to claim 4 wherein the means for mixing the energy of the synchronizing pulses with the pulses of said given channel includes retardation means to time said synchronizing pulse energy at a given time interval with respect to the positions normally assumed by the pulses of said given channel in the absence of modulation.

EMILE LABIN.
DONALD D. GRIEG.